T. SHAFFER.
AUTOMOBILE LAMP SHADE.
APPLICATION FILED APR. 25, 1914.
1,123,938.
Patented Jan. 5, 1915.
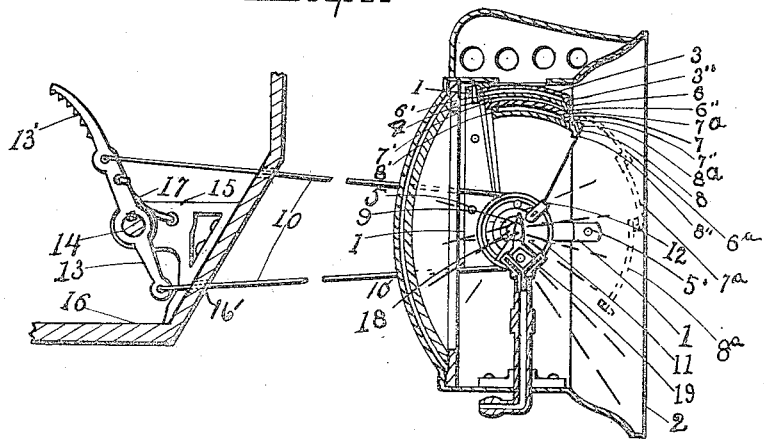
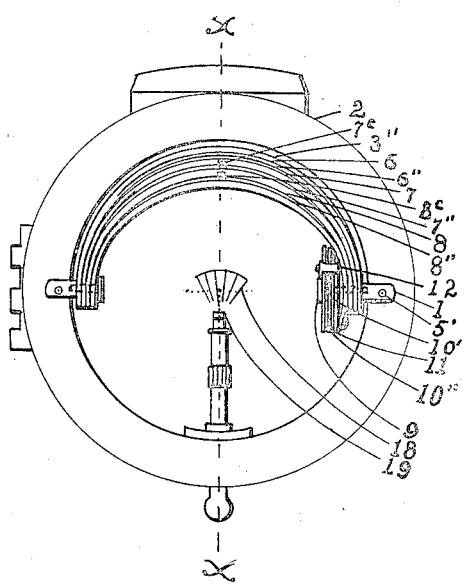
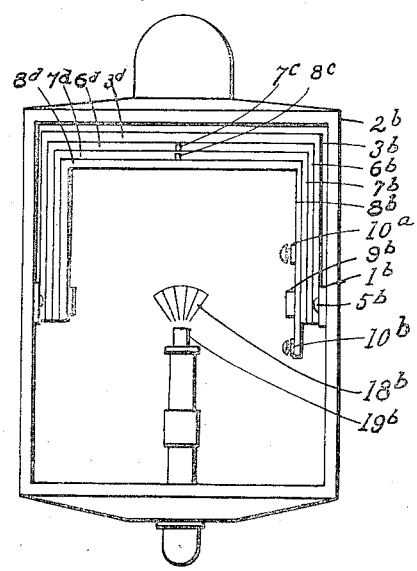
WITNESSES:
INVENTOR.
Thomas Shaffer,
BY
George W. Hinton,
ATTORNEY.

UNITED STATES PATENT OFFICE.

THOMAS SHAFFER, OF ST. JOSEPH, MISSOURI.

AUTOMOBILE LAMP-SHADE.

1,123,938. Specification of Letters Patent. Patented Jan. 5, 1915.

Application filed April 25, 1914. Serial No. 834,415.

*To all whom it may concern:*

Be it known that I, THOMAS SHAFFER, a citizen of the United States, residing at St. Joseph, in the county of Buchanan and State of Missouri, have invented certain new and useful Improvements in Automobile Lamp-Shades, of which the following is a specification, reference being had therein to the accompanying drawing.

My invention relates to improvements in that class of lamp shades that are used for partially obscuring the light of an automobile lamp, the objects of which are, to provide a simple, substantial and durable shade of this character, which shall be extremely neat and unobtrusive in appearance; by the use of which the driver of an automobile, or other vehicle, while in the driver's seat can instantly shade the lamps of his vehicle to any extent he desires, for avoiding inconveniences and accidents, caused to other persons and property, by the blinding light of unshaded lamps.

Further objects are, to so construct a shade of this character, that the entire shade and all of its appurtenances, except the treadle operated shade moving means shall be inclosed within the body of the lamp, and shall be of such form and material as will withstand the extreme heat to which certain parts of the shade are subjected.

I attain these objects by the mechanism illustrated in the accompanying drawing, in which:—

Figure 1 is a longitudinal section on the line X X, seen in Fig. 2, looking toward the right. Fig. 2 is a front view. Fig. 3 is a front view of one of the other various forms in which the lamp shade may be made.

Referring to Fig. 1, supporting bar 1 is secured to the inner surface of lamp body 2, of an automobile lamp. Said bar extends around and beneath the upper portion of said body and is secured on the rear edge of the fixed shade section 3, which latter is supported in place thereunder, by stud 4 and rivets 5, and has flange 3″. Said bar 1 extends forward against the inner surface of said body 2 at each of the two sides of the latter, and is secured thereon by rivets 5′.

The lower ends of shade sections 6, 7, and 8, are pivotally mounted on studs 9, secured in said forwardly extended portions of bar 1. Said shade sections are all of such shape as conforms with the shape of body 2, and with each other, and are underlapped beneath section 3 and beneath each other in the order named. Sections 6, 7 and 8 have upwardly projecting flanges 6′, 7′, and 8′ formed respectively on their upper edges, and also have downwardly projecting flanges 6″, 7″ and 8″ respectively formed on their front edges, for spacing and stopping said sections.

The forward portion of cable 10 is passed around the front edge of grooved pulley 11, and is secured to one point thereof, by cable clamp 12. Said pulley is secured to one of the end portions of shade section 8 and is oscillatable therewith, on one of studs 9.

The ends of cable 10 are passed backward through apertures 10′, formed through the back portion of lamp body 2, seen in Fig. 2, and thence through apertures 16′, formed through the inclined portion of floor 16 of an automobile. The ends of said cable are secured to treadle 13, which has pedal 13′ formed on its upper end. Said treadle is secured on treadle shaft 14, at a point on said treadle that is midway between said cable fastenings. Said treadle shaft is rotatably mounted in treadle shaft bearings 15, (of which but one is shown,) secured on said inclined portion of floor 16. Said shaft has recover spring 17 wound spirally thereon, one end of said spring being secured to one of said bearings, while the other end of said spring is connected with said treadle for recovering the pedally operated movement thereof.

Light 18 burns in lamp body 2, by the use of fuel, (not shown,) fed through burner 19.

In operation, with the parts in the position seen in Fig. 1, the operator shades light 18 in the following manner:—Said operator, by the use of one foot moves pedal 13′ forward, toward the right, thereby pulling the lower portion of cable 10 toward the left; which causes pulley 11 to rotate clockwise on stud 9 and thereby rotate section 8 downward toward the right to the position indicated by dotted lines 8ª. While thus moving, flange 8′ is moved against flange 7″, and thereby moves section 7 in the same manner, to the position indicated by dotted lines 7ª. While section 7 is thus moving, its flange 7′ is moved against flange 6″ and thereby moves shade section 6 to the position indicated by dotted lines 6ª. It will be seen that said shade sections, while in this described position, so shade light 18, that all of said light is thus shaded except such small portion as passes between the lower edge of section 8 and the lower portion of lamp body 2. Said operator, by controlling said movement of pedal 13′, causes said lower edge of section 8 to stop at any desired point of its movement; thus instantly shading said light to any desired extent. Said operator thus holds pedal 13′, so long as the shading of said light is desired, after which he removes his foot from said pedal, upon which, spring 17 recovers said movement of treadle 13, which by its connected parts, reversely rotates the shade section 8. During the latter part of the return movement of section 8, its stud 8ᶜ is carried against the front edge of section 7 and moves the last mentioned section upward. This movement of section 7 in turn, carries its stud 7ᶜ against the front edge of section 6, which in turn is thereby moved until its rear edge is stopped by stud 4, which thereby stops all further return movement of said sections, with the same in the position shown.

The described operations are repeated from time to time, as occasion may require that said light should thus be shaded, for preventing the temporary blinding of other persons by the same, the scaring of horses and the like. When such is done, it will be seen that the unshaded portion of said light shines downward and forward, at such angle to the ground (not shown,) as will provide sufficient light on said ground at all times, to enable said operator to see the same, a short distance ahead of the described shaded light.

While I have shown and described the shade sections 3, 6, 7, and 8 and the grooved pulley 11 operated by a cable 10 in the foregoing manner, it is evident that said shade sections could be made of a variety of forms to adapt them to use in lamp bodies of various shapes, and that the same could be rotated by a variety of differently formed rotating means. One of such different forms of shade sections and rotating means is shown in Fig. 3, in which the square lamp body 2ᵇ has the shade sections 3ᵇ, 6ᵇ, 7ᵇ, and 8ᵇ mounted therein, in practically the same manner as the sections 3, 6, 7 and 8, described. Said section 8ᵇ has pull rods 10ᵃ and 10ᵇ connected therewith for oscillating said section in the same manner as the previously described shade section 8. Said sections are provided with similar flanges and stop studs for limiting forward and backward movement of same, and since said studs and flanges are the same in construction and operation as the ones already described, the same are neither shown nor described.

Having fully described my invention, what I claim as new and desire to secure by Letters Patent is:—

1. In an automobile lamp shade, an automobile lamp body, a lamp in said body adapted to furnish a light; a plurality of shade sections in said body said sections being extended over said lamp and downward at either side thereof to the central portion of said body; a supporting bar in said body said bar being extended over said lamp and downward at either side thereof between said sections and said body and being secured to the latter and to the outer one of said sections; section mounting means secured to said bar whereon the downwardly extended end portions of all of said sections except said outer section are pivotally mounted underlapped beneath each other and beneath said outer section; section oscillating means connected with said inner section said oscillating means being extended from said section through the back of said lamp body and through intervening parts of an automobile; an automobile floor; a treadle oscillatably mounted on said floor said treadle being connected with the extended portion of said oscillating means; a pedal on the upper end of said treadle for moving the same in one direction; spring actuating means for recovering said treadle movement; and stopping means for said shade sections whereby the oscillations of said sections are stopped.

2. In an automobile lamp shade, a lamp body; a lamp in the center of said body; a shade section extending over and above said lamp and downward at each side thereof; securing means whereby said section is secured in place; a plurality of oscillatable shade sections underlapped beneath said section and underlapped one beneath the other; mounting means on which said oscillatable sections are oscillatably mounted; pedally actuated oscillating means whereby said oscillatable sections are pedally oscillated through both of the movements of their oscillations; a downwardly projecting flange formed on the front edge of each one of all of said sections; an upwardly extending flange formed on the rear edge of each one of said oscillatable sections said flanges being adapted to keep said sections spaced from each other and to limit forward movement of said oscillatable sections; and stopping means adapted to limit backward movement of said oscillatable sections.

In testimony whereof I affix my signature in the presence of two witnesses.

THOMAS SHAFFER.

Witnesses:
 THORNTON LEMMON,
 R. J. KENNARD.